July 4, 1950      C. T. BARNES      2,513,839

BACON COOKING AID

Filed Nov. 30, 1945

Inventor:
Clay T. Barnes
by Steell Jackson and Son
Attorneys

Patented July 4, 1950

2,513,839

UNITED STATES PATENT OFFICE 2,513,839

BACON COOKING AID

Clay T. Barnes, Philadelphia, Pa.

Application November 30, 1945, Serial No. 631,896

3 Claims. (Cl. 99—349)

My invention relates to an aid in cooking bacon.

A purpose of my invention is to retain the flavor and appearance of bacon while it is being cooked.

A further purpose is continuously to provide for cooking the bacon both from the top and bottom of the strip.

A purpose of my invention is to enhance the appearance and quality of cooked bacon by preventing curling and crimping of bacon strips during the cooking operation.

A further purpose is continuously to hold bacon flat against the bottom of the pan during cooking by a platen which conforms to the bacon and has high heat conductivity so as to assist the cooking operation by applying heat from the top.

A further purpose is continuously to hold and cook the bacon between two flat metal surfaces, the one being the bottom of the pan, whereby the rate of cooking is increased, whatever the temperature, and it becomes possible to cook the bacon within a reasonable time at a low temperature, thus keeping the flavor in.

A further purpose is to provide a platen extending over one or more bacon strips during cooking in the frying pan, with a fulcrum for the platen at the edge of the span, and weight between the platen and the fulcrum for loading the bacon under cooking treatment.

A further purpose is to provide a resilient connection between a platen and a fulcrum handle of a bacon cooker, with a weight adjacent the resilient connection.

Further purposes appear in the specification and in the claims.

In the drawings I have chosen to illustrate a few only of the possible embodiments of my invention, the forms shown being chosen from the standpoint of convenience in illustration, satisfactory operation and ready demonstration of the principles involved.

During the common practice of cooking bacon in a pan or on a grill, unless extreme care is taken regarding temperature control and frequent turning of the bacon, there is a distinct tendency for the bacon to curl and crimp, preventing uniform application of the cooking temperature, and greatly detracting from the appearance of the product.

By my invention I provide a very inexpensive, simple and effective bacon cooker which applies pressure to the bacon uniformly during cooking and prevents or minimizes the amount of curling and crimping.

Figure 1:
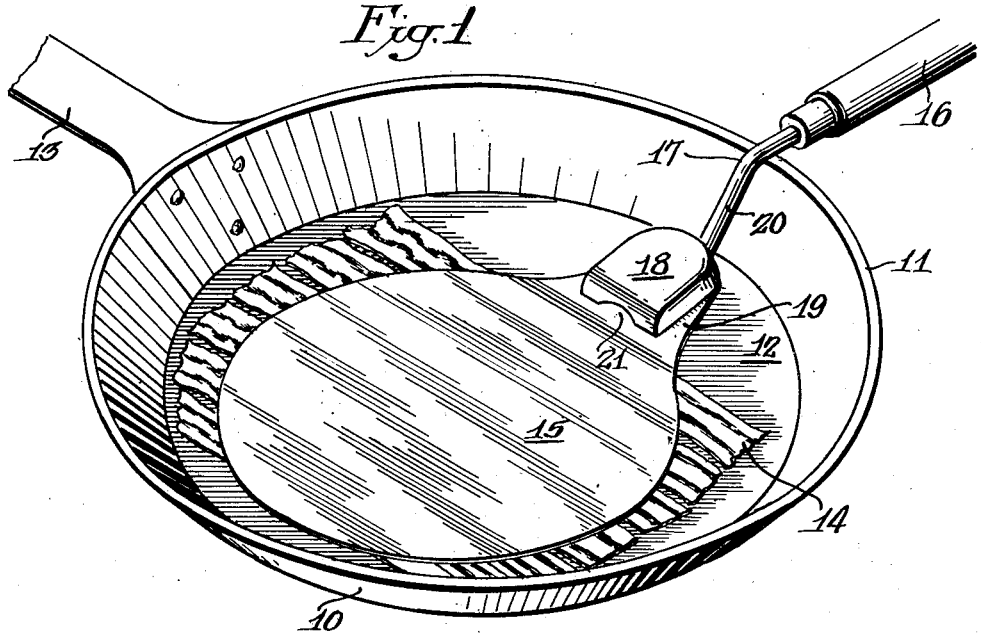
Figure 1 is a perspective view showing my bacon cooker in operation in a frying pan.
Figure 2:
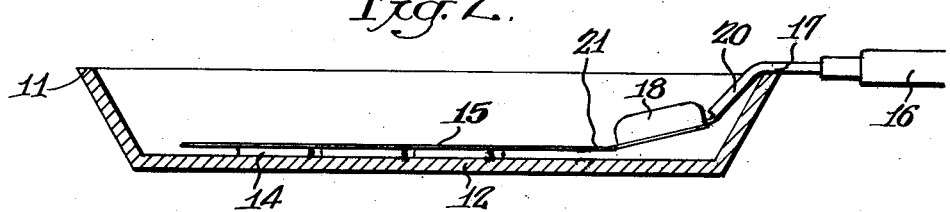
Figure 2 is a central transverse section through the pan showing the cooker in elevation.

In Figures 1 and 2, I show a typical frying pan 10 having an edge 11, bottom 12 and handle 13, and containing bacon at 14. My cooker consists of a platen 15, handle 16, handle section 17 and weight 18 interconnected as shown.

In the preferred embodiment the platen as shown is desirably a substantially circular piece of thin gage. It is a resilient sheet having a tongue extension 19 which is connected to the handle. Without limiting to a particular form, it may be indicated that the platen is preferably of aluminum, such as, for example, 3S aluminum alloy half hard or hard rolled stainless steel. The weight 18 may to advantage be of steel or other suitable material having sufficient weight and free from harmful effect upon the content. The handle is secured in any suitable manner to the platen. The fulcrum connection between the platen and the handle may satisfactorily be of steel, aluminum or the like.

In the operation of the preferred embodiment, the handle 16 extends beyond the frying pan, resting the handle section 17 upon the rim of the frying pan at a fulcrum 20, the edge 11 of the pan, the neck portion below the section 27 being suitably dimensioned at 20 so that the weight is resting above the bottom of the pan as shown in Figure 2.

The platen will flex at 21 under the action of the weight, so that substantial pressure is supplied to the bacon while the major portion of the platen rests quite flat. The flexing at 21 is assured because this portion of the platen is narrowest and therefore the weakest portion of the platen beyond the weight 18.

Figure 3:
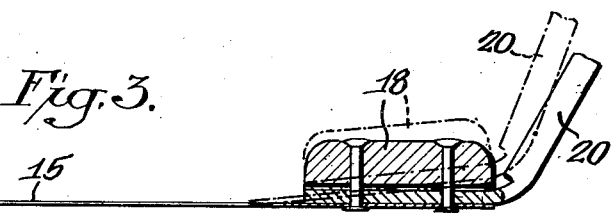
Figure 3 is a longitudinal section through the cooker.

The two positions of the weight and the flexing of the platen are satisfactorily indicated in Figure 3, where the full line position shows the platen fully extended and not flexed, whereas the dot and dash position shows the weight elevated, due to resting of the section 17 on the edge 11 of the pan. The platen is flexed so as constantly to press down on the bacon throughout the length of the platen.

Since the portion of the handle which becomes section 17 will vary with the height of the pan wall but the contact point 20 will always be the edge 11 of the pan, and thus always be the fulcrum, my bacon cooking aid will operate properly with any size of pan.

Figure 4:
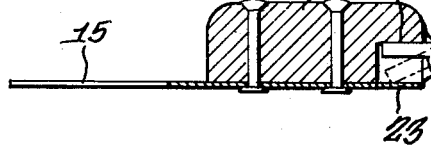
Figure 4 shows a variation of Figure 3 in longitudinal section.

The same angular change in direction between the neck and the platen adjacent the weight is provided in Figure 4 by a pivotal connection at 21 between the neck and the platen.

In operation the form of Figure 4 will function in the same way as that of Figures 1 to 3, except that in Figure 4 the neck will move between the two positions permitted by the abutments 22 and 23.

It thus will be evident that in accordance with the invention, the central portion of the platen will rest flat on the bacon in the pan and will restrain the bacon against crimping. The platen will act as a lever arm having a fulcrum at 17, on the edge of the pan.

It will be evident that in my invention no turning is required and complete cooking can be effected at a lower rate of heat transfer than is common in the prior art, with consequent greater advantage in keeping the flavor in the bacon.

It will be evident that whereas there is one metal surface only affecting the cooking in the normal method of cooking bacon within a pan, my invention permits cooking from both sides at the same time and with better contact than would otherwise be secured because of the fact that my aid flattens the bacon against the bottom of the pan and against itself.

In view of my invention and disclosure variations and modifications to meet individual whim or particular need will doubtless become evident to others skilled in the art, to obtain all or part of the benefits of my invention without copying the structure shown, and I therefore, claim all such insofar as they fall within the reasonable spirit and scope of my claims.

Having thus described my invention what I claim as new and desire to secure by Letters Patent is:

1. A bacon cooking aid for use in a pan comprising a handle and an imperforate broad flat metallic platen adapted to exert pressure on bacon being cooked, a laterally bent connecting neck adjoining the handle, rigidly secured to the handle and adapted to rest on the edge of the pan and a weight adjoining the neck the connecting neck including an angularly shiftable connection between the neck and the platen which permits the platen to seat under the weight for different angular positions of the neck.

2. In a bacon cooking aid for use in a pan, a resilient metallic imperforate platen, a handle, a laterally bent connection between the handle and the platen rigidly secured to the handle and adapted to rest on the edge of a pan, and a weight located at one side of the platen adjoining said connection and which causes the platen to flex when the connection is resting on the edge of the pan with the weight raised above the bottom of the pan.

3. In a bacon cooker, a pan having a bottom and a rim in combination with a bacon cooking aid having a broad flat metallic imperforate platen inside the pan and resting on the bottom, a handle outside the pan and adjacent the level of the top of the rim, a laterally bent crooked neck rigidly connected to the handle and extending between the handle and the platen having a portion near the bottom of the pan connected to the platen, a portion adjacent the top of the rim connected to the handle and a portion resting on the top of the rim, and a weight adjoining the neck at the platen, the connecting neck including an angularly shiftable connection between the neck and the platen which permits the platen to seat under the weight for different angular positions of the neck.

CLAY T. BARNES.

REFERENCES CITED

The following references are of record in the file of this patent:

UNITED STATES PATENTS

| Number | Name | Date |
|---|---|---|
| 383,177 | Greene et al. | May 22, 1888 |
| 1,624,214 | Cannon | Apr. 12, 1927 |
| 1,642,168 | Otte | Sept. 13, 1927 |
| 1,783,792 | Isaacson | Dec. 2, 1930 |
| 1,906,999 | Parker | May 2, 1933 |
| 2,066,749 | Frank | Jan. 5, 1937 |
| 2,241,317 | Pringle | May 6, 1941 |

FOREIGN PATENTS

| Number | Country | Date |
|---|---|---|
| 110,857 | Australia | June 19, 1940 |